(12) United States Patent
Slama et al.

(10) Patent No.: US 12,549,068 B2
(45) Date of Patent: Feb. 10, 2026

(54) E-MACHINE SYSTEM WITH ROTOR ARRANGEMENT IN FLUID CIRCUIT FOR COOLING AND LUBRICATION

(71) Applicant: Garrett Transportation I Inc., Torrance, CA (US)

(72) Inventors: David Slama, Brno (CZ); Pavel Hromek, Rajhradice (CZ); Vladimir Kalina, Třemošnice (CZ)

(73) Assignee: Garrett Transportation I Inc., Torrance, CA (US)

( * ) Notice: Subject to any disclaimer, the term of this patent is extended or adjusted under 35 U.S.C. 154(b) by 379 days.

(21) Appl. No.: 18/190,185

(22) Filed: Mar. 27, 2023

(65) Prior Publication Data

US 2024/0333099 A1 Oct. 3, 2024

(51) Int. Cl.
| | |
|---|---|
| *H02K 9/19* | (2006.01) |
| *H02K 5/04* | (2006.01) |
| *H02K 7/00* | (2006.01) |
| *H02K 7/08* | (2006.01) |
| *H02K 7/116* | (2006.01) |

(52) U.S. Cl.
CPC .......... *H02K 9/19* (2013.01); *H02K 5/04* (2013.01); *H02K 7/003* (2013.01); *H02K 7/08* (2013.01); *H02K 7/116* (2013.01)

(58) Field of Classification Search
CPC .......... H02K 9/19; H02K 5/04; H02K 7/003; H02K 7/08; H02K 7/116; H02K 5/161; H02K 5/1732; H02K 5/203
USPC ........................................................ 310/54
See application file for complete search history.

(56) References Cited

U.S. PATENT DOCUMENTS

| | | | | |
|---|---|---|---|---|
| 5,034,638 | A * | 7/1991 | McCabria | F16N 39/02 310/90 |
| 9,762,106 | B2 | 9/2017 | Gauthier et al. | |
| 9,787,164 | B2 | 10/2017 | Büttner et al. | |
| 10,797,562 | B2 | 10/2020 | Dlala et al. | |
| 11,005,337 | B2 | 5/2021 | Hung et al. | |
| 11,863,043 | B2 * | 1/2024 | Nakata | H02K 7/116 |
| 2024/0333099 | A1 * | 10/2024 | Slama | H02K 5/161 |

FOREIGN PATENT DOCUMENTS

| | | |
|---|---|---|
| CN | 115733299 A | 3/2023 |
| EP | 2487060 A1 | 8/2012 |
| EP | 3530989 A1 | 8/2019 |
| EP | 3100896 B1 | 9/2019 |
| WO | WO-2019208084 A1 * | 10/2019 ............... H02K 9/19 |

* cited by examiner

*Primary Examiner* — Ahmed Elnakib
(74) *Attorney, Agent, or Firm* — BelayIP

(57) ABSTRACT

An e-machine system includes a housing and an e-machine. The e-machine system further includes a rotor shaft that is elongate and that extends along an axis between a first end and a second end of the rotor shaft. The e-machine is at least partly supported on the rotor shaft, and the rotor shaft is supported for rotation within the housing about the axis. The system further includes a rotor shaft axial passage that extends through the rotor shaft along the axis. The rotor shaft axial passage defines an inlet extending axially through the first end and a first outlet extending axially through the second end. The rotor shaft includes a radial aperture extending radially out of the rotor shaft. The rotor shaft axial passage is configured to receive a fluid via the inlet and to distribute out the fluid via the first outlet and the radial aperture.

20 Claims, 3 Drawing Sheets

E-MACHINE SYSTEM WITH ROTOR ARRANGEMENT IN FLUID CIRCUIT FOR COOLING AND LUBRICATION

TECHNICAL FIELD

The present disclosure relates, generally, to an e-machine system such as an electric motor system, electric generator system, and the like, and the present disclosure relates, more particularly, to an e-machine system with a rotor arrangement that is in a fluid circuit for cooling and lubrication purposes.

BACKGROUND

E-machines, such as electric motors, electric generators, and combination motor/generators, are provided for a variety of uses. For example, electric traction motors are proposed for electric vehicles, locomotives, and the like.

E-machine systems may generate significant heat during operation, may operate in high-temperature environments, etc. Thus, e-machine systems are proposed that include cooling features. However, providing such cooling features remains challenging. Additionally, some e-machine systems may have moving parts that need lubrication for maintaining proper operation, but this can be difficult too. There may be detrimental increases in costs, part count, device complexity, size, bulkiness, and/or weight if these features are included.

Thus, there remains a need for an e-machine system that provides effective cooling. There also remains a need for an e-machine system that effectively lubricates parts within the system. There remains a need for these e-machine systems, wherein the cooling and/or lubricating features are provided in a relatively compact, low-weight package. There is also a need for such an e-machine system that also provides high manufacturing efficiency for reduced costs and manufacturing time.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an e-machine system is disclosed that includes a housing and an e-machine housed within the housing. The e-machine system further includes a rotor shaft that is elongate and that extends along an axis between a first end and a second end of the rotor shaft. The e-machine is at least partly supported on the rotor shaft, and the rotor shaft is supported for rotation within the housing about the axis. The system further includes a rotor shaft axial passage that extends through the rotor shaft along the axis. The rotor shaft axial passage defines an inlet extending axially through the first end and a first outlet extending axially through the second end. The rotor shaft includes a radial aperture extending radially out of the rotor shaft. The rotor shaft axial passage is configured to receive a fluid via the inlet and to distribute out the fluid via the first outlet and the radial aperture.

In another embodiment, a method of operating an e-machine system is disclosed that includes providing an e-machine that is housed within a housing. The method also includes providing a rotor shaft that is elongate and that extends along an axis between a first end and a second end of the rotor shaft. The e-machine is at least partly supported on the rotor shaft. The rotor shaft is supported for rotation within the housing about the axis. The rotor shaft includes a rotor shaft axial passage that extends through the rotor shaft along the axis. The rotor shaft axial passage defines an inlet extending axially through the first end and a first outlet extending axially through the second end. The rotor shaft includes a radial aperture extending radially out of the rotor shaft. The rotor shaft axial passage is configured to receive a fluid via the inlet and to distribute out the fluid via the first outlet and the radial aperture. The method further includes circulating a fluid from the inlet to the first outlet and the radial aperture and back to the inlet.

In a further embodiment, an e-machine system is disclosed that includes a housing and an e-machine that is housed within an e-machine housing of the housing. The system also includes a geartrain that is housed within a gearbox housing of the housing. Moreover, the system includes a rotor shaft that is elongate and that extends along an axis between a first end and a second end of the rotor shaft. The e-machine is at least partly supported on the rotor shaft. The rotor shaft is supported for rotation within the housing about the axis. The geartrain is operably coupled to the second end of the rotor shaft. Additionally, a rotor shaft axial passage extends through the rotor shaft along the axis. The rotor shaft axial passage defines an inlet extending axially through the first end and a first outlet extending axially through the second end. The rotor shaft includes a radial aperture extending radially out of the rotor shaft, the rotor shaft axial passage configured to receive a fluid via the inlet and to distribute out the fluid via the first outlet and the radial aperture. The system further includes a fluid circuit configured for flow of a fluid. The fluid circuit includes the rotor shaft axial passage and the radial aperture. The fluid circuit defines a first flow path from the inlet to the first outlet for cooling the rotor shaft. The fluid circuit also defines a second flow path from the inlet to the radial aperture for lubricating at least part of the geartrain.

Furthermore, other desirable features and characteristics of the present disclosure will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the present disclosure and not to limit the scope of the present disclosure, which is defined by the claims. Furthermore, there is no intention to be bound by any expressed or implied theory presented in the preceding technical field, background, brief summary, or the following detailed description.

Broadly, example embodiments disclosed herein include an e-machine system with an associated fluid circuit that provides cooling and/or lubrication to the e-machine system. In some embodiments, the e-machine system includes a rotor arrangement that supports an e-machine. The rotor arrangement may include one or more fluid passages, openings, conduits, tubes, apertures, etc. through which a fluid may flow for cooling and/or lubricating the e-machine system. The fluid may flow through a shaft of the rotor arrangement to cool the e-machine, bearings, and/or other features proximate the shaft. The fluid may also flow from the shaft to lubricate one or more features of the e-machine system. For example, a transmission may be operably coupled to the e-machine, and the fluid circuit may route the fluid from the shaft of the rotor arrangement to one or more gear members of the transmission.

In some embodiments, the shaft of the rotor arrangement may include an axial passage that extends from an axial inlet of the shaft to an axial outlet of the shaft. In addition, the rotor arrangement may include one or more radial apertures that are fluidly connected to the axial passage, and which extend radially out of the shaft. The fluid may circulate through the circuit, cooling the rotor arrangement as the fluid moves axially through the shaft, and the fluid may also branch out of the rotor arrangement via the radial apertures for lubricating the gear members of the transmission.

Figure 1:
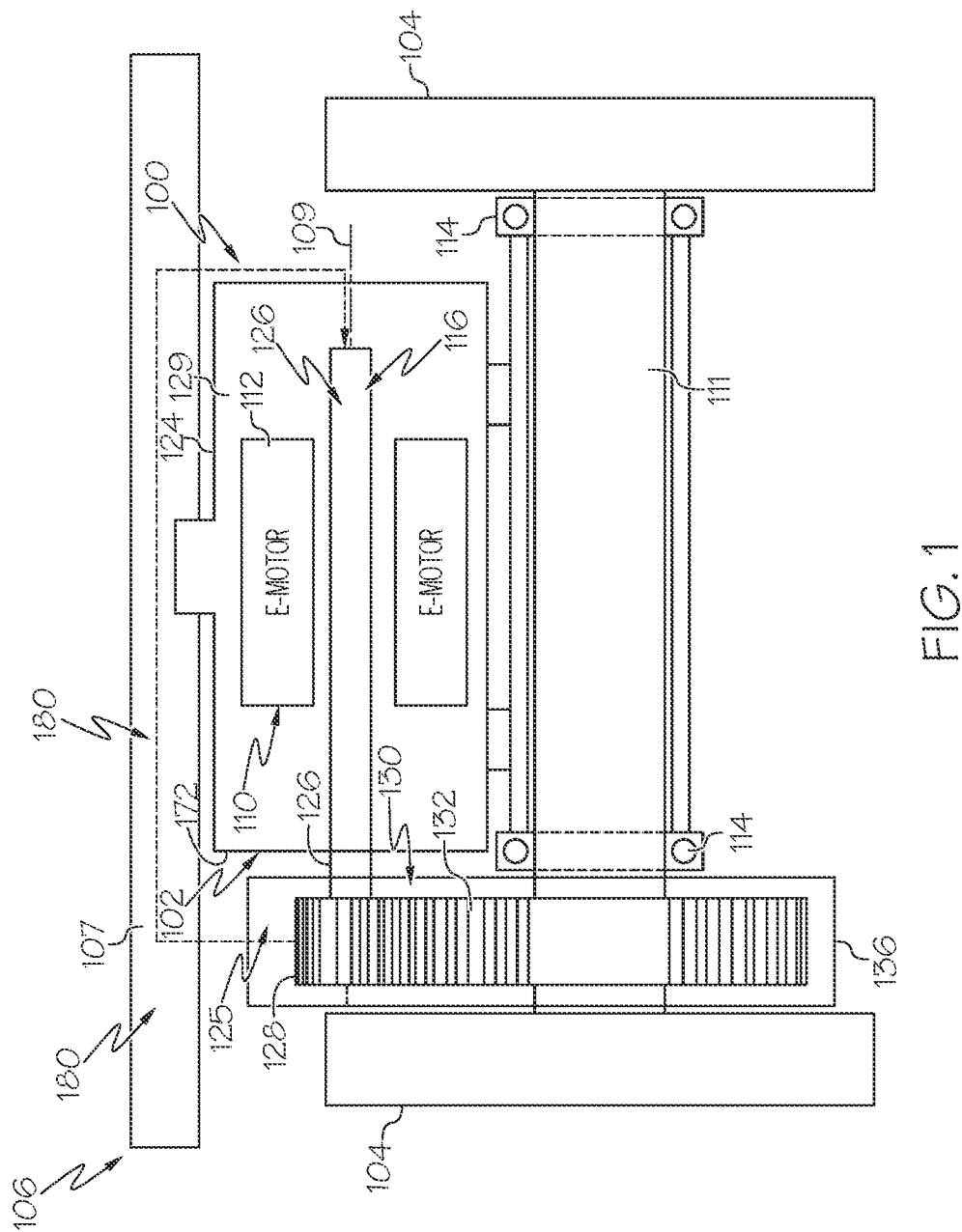
FIG. 1 is a schematic illustration of an e-machine system according to example embodiments of the present disclosure.

FIG. 1 is a schematic view of an e-machine system 100 according to example embodiments of the present disclosure. The e-machine system 100 may have a variety of configurations. In some embodiments, the e-machine system 100 may be configured as a traction drive system 102 that is included, for example, on a vehicle 106. Thus, the traction drive system 102 may be configured for driving one or more wheels 104 of the vehicle 106. More specifically, the wheels 104 may be included at opposite ends of an axle 111, and a chassis 107 may be supported on the wheels 104 by a suspension system (not shown). The vehicle 106 may be an electric car, truck, van, motorcycle, boat, or other vehicle. However, it will be appreciated that the e-machine system 100 may be configured otherwise without departing from the scope of the present disclosure. It will be appreciated, for example, that the e-machine system 100 may be configured for driving an input member of a differential, which is operatively attached to the wheels 104 without departing from the scope of the present disclosure.

Generally, the e-machine system 100 may include a housing 125. The housing 125 may include an e-machine housing 124 with a cavity 129 therein. The e-machine system 100 may also include an e-machine 110 that is received in the cavity 129 and housed within the e-machine housing 124.

The e-machine 110 may be an electric motor 112 in some embodiments. However, it will be appreciated that the e-machine 110 may be configured as an electric generator. Furthermore, the e-machine 110 may be operable in some modes as a motor and in additional modes as a generator.

The e-machine 110 may include a rotor member and a stator member that are housed within the cavity 129 of the e-machine housing 124.

Also, the e-machine system 100 may include a transmission 130. The transmission 130 may generally include a geartrain 132 that is housed within a gearbox housing 136 of the housing 125. The gearbox housing 136 may be attached (e.g., fixed) to a side wall 172 of the e-machine housing 124.

The geartrain 132 may be of any suitable type. The geartrain 132 may operatively connect the e-machine 110 and the axle 111 and may provide a chosen gear ratio from its input to its output.

The e-machine 110 may be supported by a rotor arrangement 116 within the e-machine housing 124. The rotor arrangement 116 is illustrated schematically in FIG. 1 and is illustrated according to example embodiments in FIGS. 2 and 3. As will be discussed, the rotor arrangement 116 may include components supported for rotation about an axis 109 (i.e., rotation axis 109) within the e-machine housing 124. For example, the rotor arrangement 116 may at least partly include, define, and/or operatively connect to a rotor shaft 126 of the e-machine 110. The rotor member of the e-machine 110 may be supported on the rotor shaft 126, and the stator member of the e-machine 110 may be fixed within the e-machine housing 124 and may surround the rotor member and the rotor shaft 126. In embodiments in which the e-machine 110 is an electric motor 112, the rotor shaft 126 may be referred to as an output rotor shaft 126 of the electric motor 112.

In some embodiments, a shaft engagement member 128 may be operably supported on the rotor shaft 126. The shaft engagement member 128 may be a gear, a spline, or other feature for operatively attaching to the transmission 130. Furthermore, the e-machine 110 may be coupled to the wheels 104 via the transmission 130. The geartrain 132 may be attached to the shaft engagement member 128 and to the axle 111. The gearbox housing 136 and the e-machine housing 124 may be moveably supported on the axle 111 by one of more bearings 114 (e.g., a bearing sleeve, suspension tube, etc.) such that the axle 111 may rotate relative thereto.

During operation, the electric motor 112 may rotatably drive the rotor shaft 126 and the shaft engagement member 128 supported thereon. This rotational power may transfer to the geartrain 132, which may transmit the power to the axle 111 to rotate the wheels 104 and propel the vehicle 106.

Furthermore, the e-machine system 100 may include a fluid circuit 180. The fluid circuit 180 may be configured for circulating a fluid, such as a lubricating and/or cooling fluid. The fluid may be a liquid. The fluid may be a lubricant/coolant oil in some embodiments. The fluid may, therefore, be a number of known lubricating oils also used in heat exchanger/cooling systems.

Furthermore, the fluid circuit 180 may be coupled to the rotor arrangement 116 as will be discussed. Accordingly, the fluid circuit 180 and the rotor arrangement 116 may include features that provide cooling to the rotor arrangement 116 and to surrounding features of the e-machine system 100. Furthermore, the fluid circuit 180 and the rotor arrangement 116 may include features that provide lubrication to the shaft engagement member 128, the geartrain 132, bearing(s), and/or other components of the e-machine system 100.

Figure 2:
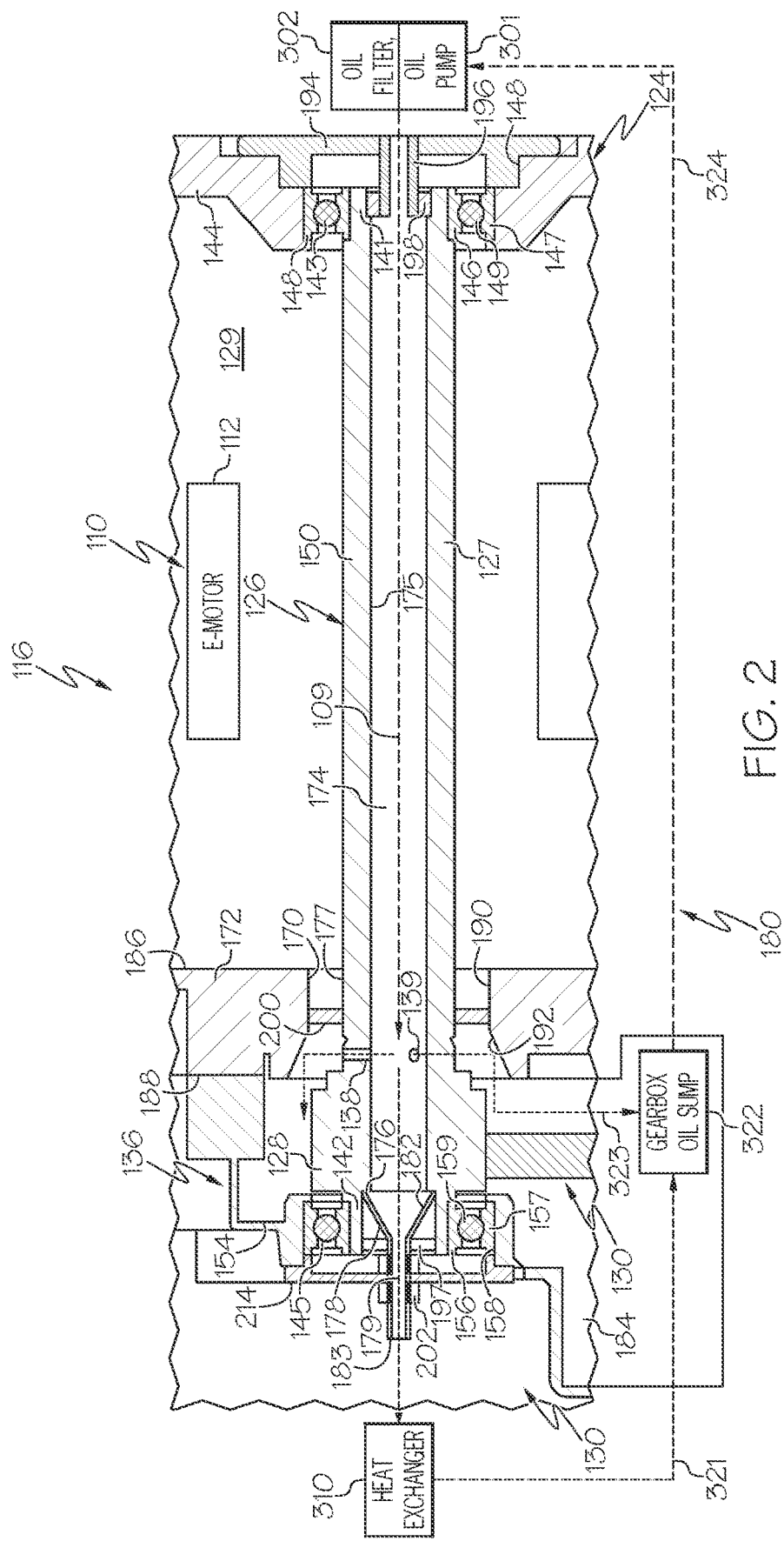
FIG. 2 is a cross-sectional view of a rotor arrangement of the e-machine system of FIG. 1 according to example embodiments of the present disclosure.

FIG. 2 shows the rotor arrangement 116 in additional detail according to example embodiments. As shown, the rotor shaft 126 may include a shaft member 127 that is elongate and that may extend along the axis 109 between a first end 141 and a second end 142. The shaft member 127 of the rotor shaft 126 may be a hollow cylinder. The first end 141 may be supported by a first bearing member 143 for rotation in the e-machine housing 124, and the second end 142 may be supported for rotation by a second bearing member 145 within the gearbox housing 136. The shaft member 127 may include an intermediate portion 150, which is disposed axially between the first end 141 and the second end 142. The first end 141 may be stepped downward in diameter from that of the intermediate portion 150. The second end 142 may be similarly stepped downward in diameter.

The first end 141 may be supported on a first wall member 144 of the e-machine housing 124 by the first bearing member 143. The first bearing member 143 may be a rolling element bearing in some embodiments. The first end 141 may be stepped in diameter in some embodiments to engage with an inner race 146 of the first bearing member 143. The first wall member 144 may be defined by a cap- or bell-shaped part and may be fixed to other stiff and strong structures of the e-machine housing 124. The first wall member 144 may include a stepped bore 148 that receives an outer race 147 of the first bearing member 143. The first bearing member 143 may also include one or more rolling elements 149 between the inner and outer races 146, 147.

The intermediate portion 150 may extend through an aperture 170 of the side wall 172 of the e-machine housing 124 to extend axially out of the e-machine housing 124. Thus, the second end 142 may extend out of the e-machine housing 124 and may be disposed within the gearbox housing 136. The side wall 172 may include a first face 186 and a second face 188, which face in opposite axial directions. The aperture 170 may have a first portion 190, which may have a substantially constant diameter along its axial length. The aperture 170 may also have a deflection portion 192, which may have a frustoconic taper that widens gradually in diameter as the deflection portion 192 extends axially from the first portion 190. Accordingly, the deflection portion 192 may be tapered and angled to generally face in an axial direction toward the shaft engagement member 128 and the gear space 184.

The second end 142 may be supported on a second wall member 154 by the second bearing member 145. The second end 142 may be stepped in diameter in some embodiments to engage with an inner race 156 of the second bearing member 145. The second wall member 154 may be a wall of the gear box housing 136. The second wall member 154 may be fixedly attached to the side wall 172 of the e-machine housing 124 so as to define a gear space 184 therebetween. The second wall member 154 may include a stepped bore 158 that receives an outer race 157 of the second bearing member 145. The second bearing member 145 may also include one or more rolling elements 159 between the inner and outer races 156, 157.

Furthermore, the shaft engagement member 128 may be supported on the second end 142, within the gear space 184 of the gear box housing 136. As such, the shaft engagement member 128 may be disposed between the second bearing member 145 and the wall 172 along the axis. The shaft engagement member 128 may be of a variety of types (e.g., a spur gear, a helical gear, a bevel gear, a spline, or other type). The shaft engagement member 128, in some embodiments, may be an independent gear that is connected to (e.g., fixed to) the rotor shaft 126. In additional embodiments, as represented in FIG. 2, the shaft engagement member 128 may be integrally attached to the rotor shaft 126 so as to be unitary therewith.

The shaft member 127 of the rotor shaft 126 may be hollow to include a passage 174 that extends from the first end 141 to the second end 142. The passage 174 may be open at the first end 141 and the second end 142, and the passage 174 may extend continuously therebetween along the axis 109. The passage 174 may be defined by an inner diameter surface 175 of the shaft member 127. The inner diameter surface 175 may include an inner step 176 proximate the second end 142.

Additionally, the shaft member 127 may include at least one radial aperture, such as a first radial aperture 138 and a second radial aperture 139. There may be more or less than two radial apertures 138, 139. The first and second radial apertures 138, 139 may extend radially from the inner radial surface 175 to an outer radial surface 177 of the shaft member 127. The first and second radial apertures 138, 139 may be spaced apart in a circumferential direction about the axis 109. The first and second radial apertures 138, 139 may be oriented perpendicular to the axis 109 in some embodiments.

The rotor shaft 126 may further include a transition tube 178. The transition tube 178 may be hollow and tubular with an inner passage 179 extending axially therethrough. The transition tube 178 may include an inner passage 179. The transition tube 178 may include an upstream end 182 that is frusto-conic, and the transition tube 178 may include a downstream end 183 that has a constant diameter. In additional embodiments, the downstream end 183 may progressively reduce in diameter for jetting fluid therefrom. The upstream end 182 may be seated against the inner step 176 of the shaft member 127, and the downstream end 183 may extend and project axially out from the second end 142 of the shaft member 127. The inner passage 179 may be fluidly connected to the passage 174. The inner passage 179 may taper gradually downward in diameter as the inner passage 179 extends through the upstream end 182 toward the downstream end 183, and the inner passage 179 may remain a constant diameter as the inner passage 179 extends through the downstream end 183.

The rotor arrangement 116 may further include a first end cap 194. The first end cap 194 may be disc-shaped and may be fixedly attached to the first wall member 144 proximate the first end 141 of the rotor shaft 126. The first end cap 194 may also include a hollow inlet tube 196 that projects into the passage 174 of the rotor shaft 126. The inlet tube 196 may be fixed relative to the first wall member 144, and the inlet tube 196 may be fluidly connected to the passage 174. In some embodiments, the rotor arrangement 116 may include a first seal member 198. The first seal member 198 may be a known sealing feature that is included radially between the inlet tube 196 and the inner radial surface 175 of the passage 174 to define a fluid seal therebetween.

The rotor arrangement 116 may further include a second seal member 200. The second seal member 200 may be a known seal that is included radially between the intermediate portion 150 and the inner radial surface defining the first portion 190 of the aperture 170. The second seal member 200 may define a fluid seal between the cavity 129 and the gear space 184. The second seal member 200 may be disposed in an axial position that is between the first and second radial apertures 138, 139 and the cavity 129.

The rotor arrangement 116 may additionally include a third seal member 197. The third seal member 197 may be a known seal that is included radially between the downstream end 183 of the transition tube 178 and the second wall member 154. The third seal member 197 may define a fluid seal between the exterior of the shaft 126 and the passage 174 therein.

The rotor arrangement 116 may further include a second end cap 214. The second end cap 214 may be disc-shaped and may be fixedly attached to the second wall member 154, proximate the second end 142 of the rotor shaft 126. The second end cap 214 may receive the downstream end 183 of the transition tube 178. The rotor arrangement 116 may include a fastener, such as a nut 202 that attaches the downstream end 183 to the second end cap 214. The nut 202 may be a known fastener.

The fluid circuit 180 is represented schematically in FIG. 2 according to example embodiments. The fluid circuit 180 may include flow structures (tubes, pipes, etc.) that fluidly connect the components discussed herein. The fluid circuit 180 may be a closed fluid circuit with at least one oil pump 301 that pumps the fluid therethrough. The fluid circuit 180 may also include an oil filter 302 that filters the fluid as it moves therethrough. The fluid circuit 180 may further include a heat exchanger 310, such as a cross-flow radiator system that is supported on the vehicle 106. The heat exchanger 310 may be configured for cooling (i.e., removing heat) from the fluid as it flows therethrough.

As shown in FIG. 2, the inlet tube 196 and, thus, the first end 141 of the shaft 126 may be fluidly connected to the fluid circuit 180. The inlet tube 196 and the first end 141 may define a fluid inlet into the passage 174 of the rotor arrangement 116.

Furthermore, the downstream end 183 and, thus, the second end 142 of the rotor shaft 126 may be fluidly connected to the fluid circuit 180. The downstream end 183 and second end 142 may extend axially and may define a first outlet from the passage 174.

Additionally, the radial apertures 138, 139 may be fluidly connected to the fluid circuit 180. The radial apertures 138, 139 may extend radially and may define respective second outlets from the passage 174.

The fluid circuit 180 may additionally include a first outlet branch 321, which may include one or more pipes or other fluid conduits. The first outlet branch 321 may be fluidly connected, at its upstream end, to the end 183 of the transition tube 178 at the second end 142 of the shaft member 127. The first outlet branch 321 may be fluidly connected, at its downstream end, to the gearbox housing 136 (e.g., to the gearbox oil sump 322 within the gearbox housing 136).

Additionally, the fluid circuit 180 may include a second outlet branch 323. The second outlet branch 323 may be fluidly connected, at its upstream end, to the radial apertures 138, 139 (i.e., to the second outlet of the rotor shaft 126). The second outlet branch 323 may be fluidly connected, at its downstream end, to the gearbox housing 136 (e.g., to the gearbox oil sump 322 within the gearbox housing 136).

Moreover, the fluid circuit 180 may include a return branch 324. The return branch 324 may be fluidly connected, at its upstream end, to the gearbox housing 136 (e.g., to the gearbox oil sump 322 within the gearbox housing 136). The return branch 324 may be fluidly connected, at its downstream end, to the inlet tube 196 at the first end 141 of the shaft member 127.

In some embodiments, the heat exchanger 310 may be operatively coupled to the fluid circuit 180 within the first outlet branch 321. Thus, the heat exchanger 310 may be disposed between the first outlet (i.e., the end 183 at the second end 142) and the gearbox housing 136 in a flow direction through the first outlet branch 321. Furthermore, the oil pump 301 and oil filter 302 may be operatively coupled to the fluid circuit 180 within the return branch 324.

Accordingly, during operation of the e-machine 110, the fluid circuit 180 may circulate fluid through the rotor shaft 126 of the rotor arrangement 116. The fluid may receive heat from the e-machine 110 via the shaft member 127 to maintain operating temperatures of the e-machine 110 relatively low. The tapered shape of the transition tube 178 may regulate pressure, mitigate pressure drop, and/or maintain desirable flow pressure. Furthermore, some of the fluid may exit from the transition tube 178 to be cooled by the heat exchanger 310, while the remaining fluid may exit via the radial apertures 138, 139 to lubricate the shaft engagement member 128 and/or the gear train 132. The radial apertures 138, 139 may also regulate flow, mitigate pressure drop, and/or maintain desirable flow of the fluid. Fluid that may be flowing axially away from the shaft engagement member 128 may be re-directed in the opposite axial direction by the deflection portion 192 due to its beveled shape. The second seal member 200 may further inhibit backflow into the e-machine housing 124. Flows from the first and second outlet branches 321, 323 may merge back at the gearbox oil sump 322. From there, the fluid may flow to the oil pump 301 and oil filter 302 before being re-circulated back to the inlet tube 196 and the first end 141 of the passage 174.

Figure 3:
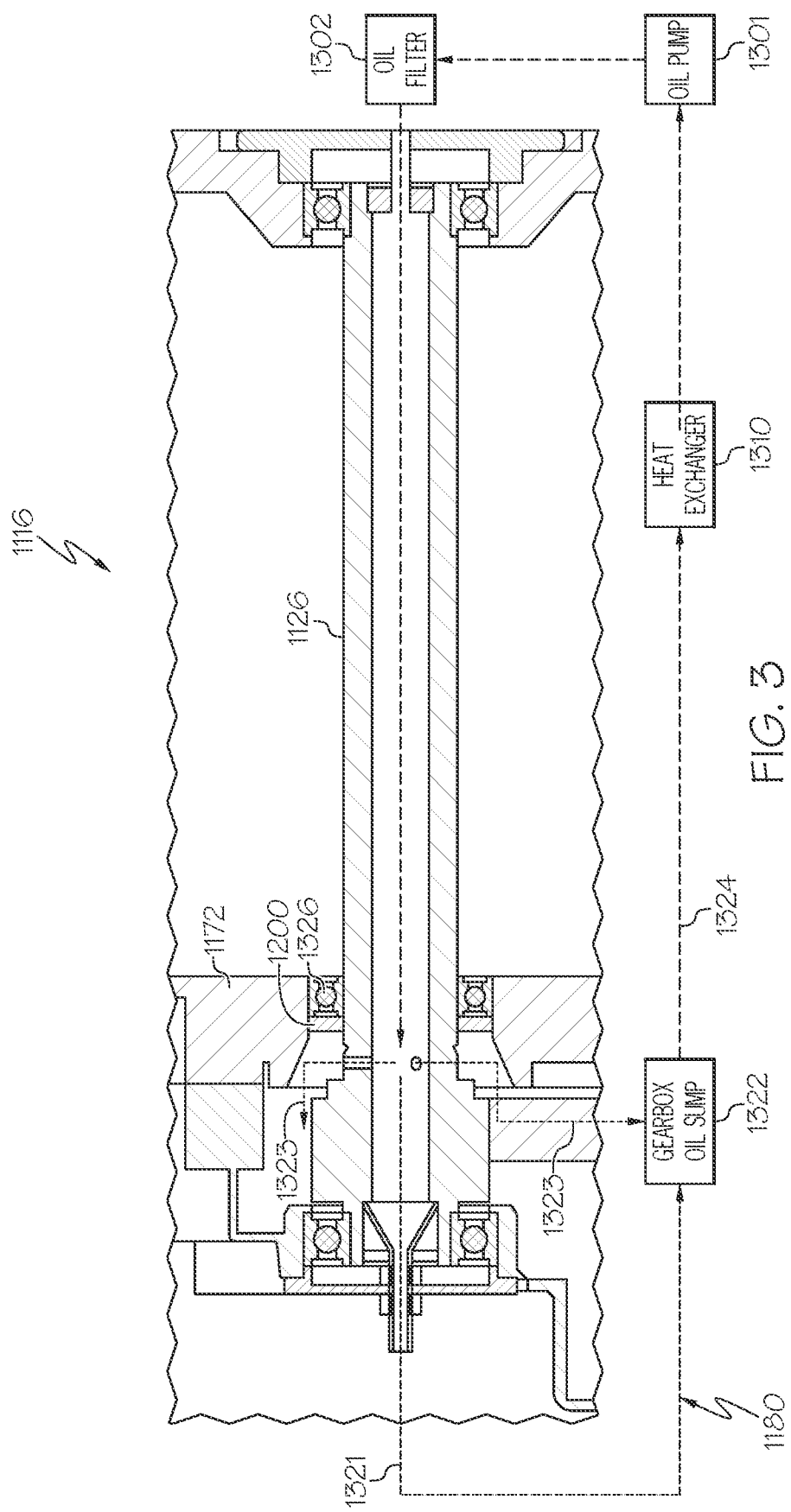
FIG. 3 is a cross-sectional view of the rotor arrangement of the e-machine of FIG. 1 according to additional example embodiments of the present disclosure.

The rotor arrangement 1116 and fluid circuit 1180 are shown in FIG. 3 according to additional example embodiments. The rotor arrangement 1116 and fluid circuit 1180 may be substantially similar to the embodiments of FIG. 2 except as noted. Features that correspond to those of FIG. 2 are indicated with corresponding reference numbers increased by 1000. Description of those components will not be repeated for the sake of brevity.

As shown, the rotor shaft 1126 may be substantially the same as the embodiments of FIG. 2. The fluid circuit 1180 may include and fluidly connect the oil pump 1301, the oil filter 1302, the gearbox oil sump 1322. However, the heat exchanger 1310 may be fluidly connected to the return branch 1324 as shown in FIG. 3. In other words, the heat exchanger 1310 may be operatively coupled to the fluid circuit 1180 and disposed downstream of the gearbox housing 1124 in a flow direction through the fluid circuit 1180. Thus, fluid from the first outlet branch 1321 may flow directly to the gearbox oil sump 1322, fluid from the second outlet branch 1323 may flow to the gear train 1132 before flowing to the gearbox oil sump 1322, and these flows may merge before flowing to the heat exchanger 1310 in the return branch 1324. Additional arrangements of the fluid circuit are envisioned as well. For example, the fluid circuit 1180 may include the oil filter 1302 upstream of the oil pump 1301 in some embodiments.

Furthermore, as shown in FIG. 3, the rotor arrangement 1116 may include a bearing 1326 (i.e., a third bearing, a motor housing bearing). The bearing 1326 may be a rolling element bearing that is supported between the shaft 1126 and the side wall 1172. The second seal member 1200 may be axially disposed between the bearing 1326 and the second outlet branch 1323 to seal the bearing 1326 against the coolant flow.

Accordingly, the e-machine systems 100 of the present disclosure may provide effective cooling. Furthermore, the e-machine systems 100 of the present disclosure may provide lubrication to the geartrain and/or other moving parts. These features may also be provided in a compact, low-weight package. Additionally, the e-machine systems 100 of the present disclosure may have a relatively low part count, may be manufactured efficiently for reduced manufacturing costs and time.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An e-machine system comprising:
   a housing;
   an e-machine housed within the housing;
   a rotor shaft that is elongate and that extends along an axis between a first end and a second end of the rotor shaft, the e-machine at least partly supported on the rotor shaft, the rotor shaft supported for rotation within the housing about the axis; and
   a rotor shaft axial passage that extends through the rotor shaft along the axis, the rotor shaft axial passage defining an inlet extending axially through the first end and a first outlet extending axially through the second end, the rotor shaft including a radial aperture extending radially out of the rotor shaft, the rotor shaft axial passage configured to receive a fluid via the inlet and to distribute out the fluid via the first outlet and the radial aperture;
   a geartrain operably coupled to the rotor shaft, the geartrain housed within a gearbox housing of the housing;
   the radial aperture is fluidly connected to the gearbox housing to provide lubrication to at least part of the geartrain;
   the housing including the gearbox housing and an e-machine housing that houses the e-machine, the rotor shaft extending through an aperture in a wall of the housing to extend between both the gearbox housing and the e-machine housing; and
   the aperture including a deflection portion that is shaped to deflect the fluid in a generally axial direction along the axis toward the second end.

2. The e-machine system of claim 1, wherein the radial aperture is one of a plurality of radial apertures that extend radially out of the rotor shaft and that are spaced apart about the axis.

3. The e-machine system of claim 1, wherein the aperture includes a frustoconic, tapered portion that is angled to face substantially toward the second end to direct the fluid toward the second end.

4. The e-machine system of claim 1, further comprising a shaft engagement member that is included on the second end of the rotor shaft, the shaft engagement member coupling the geartrain to the rotor shaft, the shaft engagement member being integrally attached to the rotor shaft.

5. The e-machine system of claim 1,
   further comprising a first rolling element bearing that supports the first end in the e-machine housing;
   further comprising a second rolling element bearing that supports the second end in the gearbox housing;
   further comprising a shaft engagement member that is included on the second end of the rotor shaft within the gearbox housing, the shaft engagement member coupling the geartrain to the rotor shaft, the shaft engagement member disposed between the second rolling element bearing and the wall along the axis.

6. The e-machine system of claim 1, wherein the rotor shaft includes a hollow shaft member that extends between the first end and the second end, the rotor shaft including a transition tube that is hollow and disposed at the second end, the transition tube including an inner passage that gradually tapers downward in a width direction in a downstream direction.

7. The e-machine system of claim 1, further comprising an inlet tube that is fixed relative to the housing and that is received in the rotor shaft axial passage to fluidly connect to the inlet.

8. The e-machine system of claim 1, further comprising a fluid circuit configured to circulate the fluid through the rotor shaft axial passage from the inlet to the first outlet and the radial aperture.

9. The e-machine system of claim 8,
wherein the fluid circuit includes a first outlet branch that is fluidly connected at an upstream end to the first outlet, the first outlet branch fluidly connected at a downstream end to the gearbox housing;
wherein the fluid circuit includes a second outlet branch that is fluidly connected at an upstream end to the radial aperture and that is fluidly connected at a downstream end to the gearbox housing; and
wherein the fluid circuit includes a return branch that is fluidly connected at an upstream end to the gearbox housing and that is fluidly connected at a downstream end to the inlet.

10. The e-machine system of claim 9, further comprising a heat exchanger that is operatively coupled to the fluid circuit, the heat exchanger being disposed between the first outlet and the gearbox housing in a flow direction through the first outlet branch.

11. The e-machine system of claim 9, further comprising a heat exchanger that is operatively coupled to the fluid circuit, the heat exchanger being disposed downstream of the gearbox housing in a flow direction through the fluid circuit.

12. The e-machine system of claim 1, wherein the radial aperture is one of a plurality of radial apertures that extend radially out of the rotor shaft and that are spaced apart about the axis.

13. An e-machine system comprising:
a housing;
an e-machine housed within the housing;
a rotor shaft that is elongate and that extends along an axis between a first end and a second end of the rotor shaft, the e-machine at least partly supported on the rotor shaft, the rotor shaft supported for rotation within the housing about the axis;
a rotor shaft axial passage that extends through the rotor shaft along the axis, the rotor shaft axial passage defining an inlet extending axially through the first end and a first outlet extending axially through the second end, the rotor shaft including a radial aperture extending radially out of the rotor shaft, the rotor shaft axial passage configured to receive a fluid via the inlet and to distribute out the fluid via the first outlet and the radial aperture; and
the rotor shaft including a hollow shaft member that extends between the first end and the second end, the rotor shaft including a transition tube that is hollow and disposed at the second end, the transition tube including an inner passage that gradually tapers downward in a width direction in a downstream direction.

14. The e-machine system of claim 13, wherein the radial aperture is one of a plurality of radial apertures that extend radially out of the rotor shaft and that are spaced apart about the axis.

15. The e-machine system of claim 13, further comprising a geartrain operably coupled to the rotor shaft, the geartrain housed within a gearbox housing of the housing; and
wherein the radial aperture is fluidly connected to the gearbox housing to provide lubrication to at least part of the geartrain.

16. The e-machine system of claim 13, further comprising an inlet tube that is fixed relative to the housing and that is received in the rotor shaft axial passage to fluidly connect to the inlet.

17. The e-machine system of claim 13, further comprising a fluid circuit configured to circulate the fluid through the rotor shaft axial passage from the inlet to the first outlet and the radial aperture.

18. An e-machine system comprising:
a housing;
an e-machine housed within the housing;
a rotor shaft that is elongate and that extends along an axis between a first end and a second end of the rotor shaft, the e-machine at least partly supported on the rotor shaft, the rotor shaft supported for rotation within the housing about the axis; and
a rotor shaft axial passage that extends through the rotor shaft along the axis, the rotor shaft axial passage defining an inlet extending axially through the first end and a first outlet extending axially through the second end, the rotor shaft including a radial aperture extending radially out of the rotor shaft, the rotor shaft axial passage configured to receive a fluid via the inlet and to distribute out the fluid via the first outlet and the radial aperture;
a geartrain operably coupled to the rotor shaft, the geartrain housed within a gearbox housing of the housing;
the fluid circuit including a first outlet branch that is fluidly connected at an upstream end to the first outlet, the first outlet branch fluidly connected at a downstream end to the gearbox housing;
the fluid circuit including a second outlet branch that is fluidly connected at an upstream end to the radial aperture and that is fluidly connected at a downstream end to the gearbox housing; and
the fluid circuit including a return branch that is fluidly connected at an upstream end to the gearbox housing and that is fluidly connected at a downstream end to the inlet.

19. The e-machine system of claim 18, further comprising a heat exchanger that is operatively coupled to the fluid circuit, the heat exchanger being disposed between the first outlet and the gearbox housing in a flow direction through the first outlet branch.

20. The e-machine system of claim 18, further comprising a heat exchanger that is operatively coupled to the fluid circuit, the heat exchanger being disposed downstream of the gearbox housing in a flow direction through the fluid circuit.

\* \* \* \* \*